(12) United States Patent
Glomb, Sr.

(10) Patent No.: US 8,776,654 B2
(45) Date of Patent: Jul. 15, 2014

(54) CROWN MOLDING SCALES FOR A MITER SAW

(76) Inventor: Timothy J. Glomb, Sr., Kennett Square, PA (US)

( * ) Notice: Subject to any disclaimer, the term of this patent is extended or adjusted under 35 U.S.C. 154(b) by 607 days.

(21) Appl. No.: 12/923,364

(22) Filed: Sep. 16, 2010

(65) Prior Publication Data
US 2011/0067544 A1  Mar. 24, 2011

Related U.S. Application Data

(60) Provisional application No. 61/276,835, filed on Sep. 18, 2009.

(51) Int. Cl.
*B23D 45/14* (2006.01)
*B23D 47/04* (2006.01)
*B23Q 17/22* (2006.01)
*B26D 7/01* (2006.01)
*B27B 5/29* (2006.01)
*B27G 5/02* (2006.01)

(52) U.S. Cl.
USPC ........ 83/468; 83/468.3; 83/471.3; 83/522.11; 83/522.18; 33/533; 33/571; 33/645; 33/712

(58) Field of Classification Search
USPC ........... 83/471.3, 522.18, 522.19, 468, 468.1, 83/468.2, 468.3, 471.2, 473, 477.1, 490, 83/522.11, 522.15, 522.16, 522.17, 581, 83/802; 33/533, 571, 573, 628, 630, 633, 33/640, 645, 712, 755, 758, 771
See application file for complete search history.

(56) References Cited

U.S. PATENT DOCUMENTS

| | | | | |
|---|---|---|---|---|
| 2,599,893 A * | 6/1952 | Butler | ............................ | 83/464 |
| 2,606,580 A * | 8/1952 | Johnson | ......................... | 83/412 |
| 3,066,710 A * | 12/1962 | Silken | ............................ | 83/468 |
| 3,302,669 A * | 2/1967 | Edler | ........................ | 83/471.3 |
| 3,352,334 A * | 11/1967 | Hunn | ............................ | 144/129 |
| 4,300,426 A * | 11/1981 | Weaver | ....................... | 83/471.3 |
| 5,632,096 A * | 5/1997 | Horvath | ......................... | 33/628 |
| 6,101,733 A * | 8/2000 | Horvath | ......................... | 33/628 |
| 7,581,333 B2 * | 9/2009 | Dressler | ......................... | 33/758 |
| 2006/0254071 A1 * | 11/2006 | Kilpatrick et al. | ............. | 33/758 |
| 2007/0234864 A1 * | 10/2007 | Bettacchini | ................. | 83/471.3 |
| 2007/0271806 A1 * | 11/2007 | Dressler | ......................... | 33/758 |

* cited by examiner

*Primary Examiner* — Clark F. Dexter

(57) ABSTRACT

The invention is includes a series of dimensional scales (linear measuring device) on the top surface of a miter saw table. The scales allow for measurements to be located or obtained on the saw table relative to the saw fence and relative to the saw blade. The scales may replace the need for a hand held tape measure or ruler for measuring or marking the saw table surface when cutting crown molding or other materials. The scales could be placed on or in a saw during production by a manufacturer. The scales could be placed on or in a material to be placed on a saw during production by a manufacturer. The scales could be placed on or in a material to be placed on an existing saw.

6 Claims, 2 Drawing Sheets

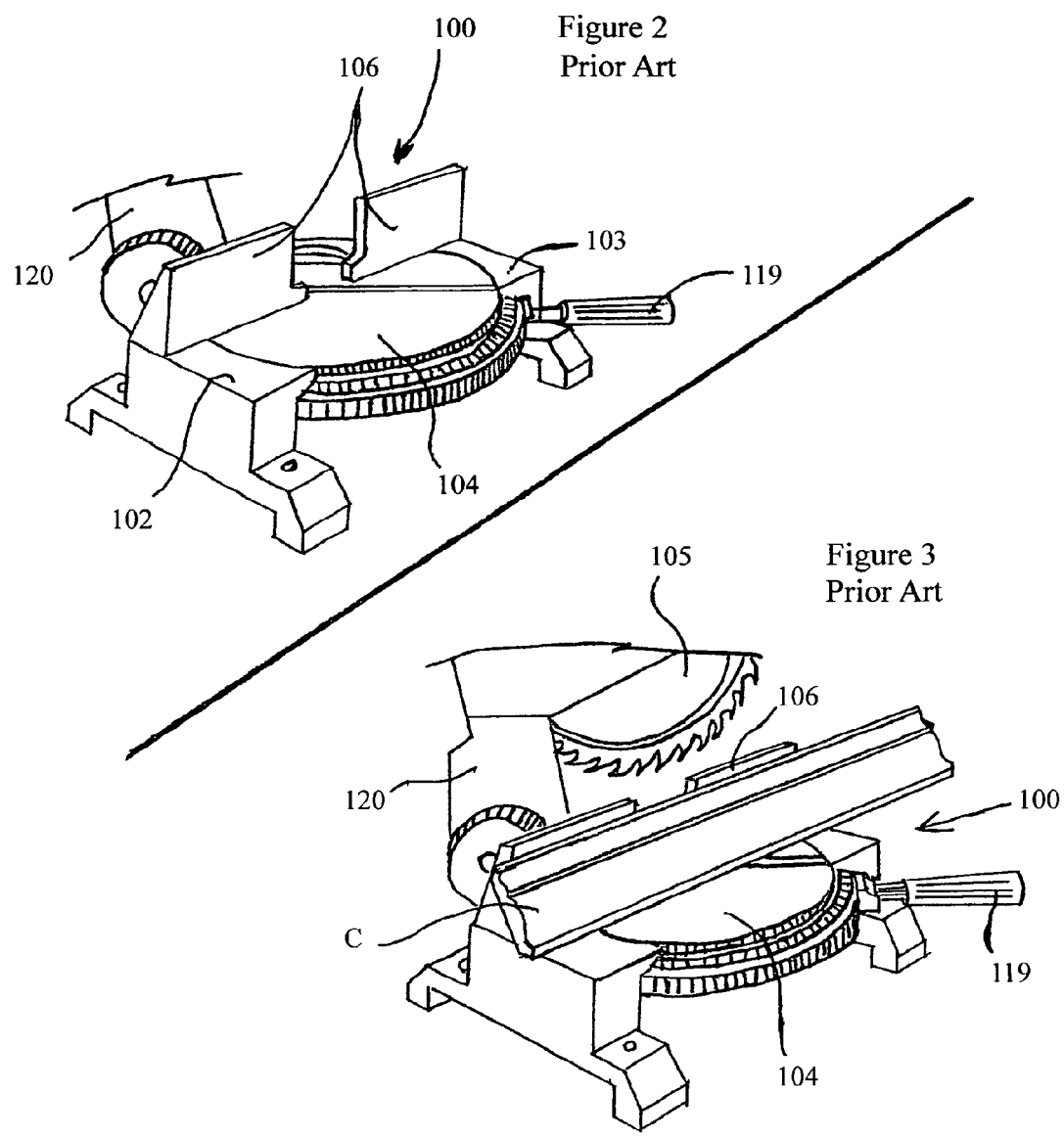

CROWN MOLDING SCALES FOR A MITER SAW

CROSS-REFERENCE TO RELATED APPLICATIONS

This application claims benefits of Provisional Application for Patent No. 61/276/835, filed Sep. 18, 2009, applicant—Timothy J. Glomb Sr., Kennett Square, Pa.

STATEMENT REGARDING FEDERALLY SPONSORED RESEARCH OR DEVELOPMENT

"Not Applicable"

REFERENCE TO A SEQUENCE LISTING, A TABLE, OR A COMPUTER PROGRAM, LISTING COMPACT DISC APPENDIX

"Not Applicable"

BACKGROUND OF THE INVENTION

1. The invention pertains to an improvement to a miter saw table for locating dimensions on the table. In the art of finish carpentry, specifically moldings and decorative trim work, it is commonly understood that installing crown molding is a difficult and tedious task for professionals and "do-it-yourselfers". Crown molding is a decorative trim generally seen in a room along the top of the walls where the wall meets the ceiling. The bottom edge of the molding lies against the wall, the top edge of the molding lies against the ceiling and the face of the molding lies at an angle between the wall surface and the ceiling surface. Although this is the most common application of crown molding it can be used elsewhere. The wall/ceiling location of crown molding is the focus of this explanation. A basic room has four walls, so a basic installation of crown molding in a room would have four inside corner joints. An inside corner is where two walls meet and face each other, usually at a 90 degree angle. Concepts explained here may be applied to other molding applications and for outside corner joints. On average there are more inside corner joints than any other joining of the molding. So emphasis may be placed on cutting crown molding for assembling inside corners joints, and emphasis may be placed on the design of tools used for cutting crown molding for assembling inside corner joints.

2. In the art, it is known, there are two methods of assembling an inside corner joint. The first method is a miter joint. This joint is made by beveling the end of two pieces of crown molding at equal compound angles but alternate directions to be joined at a corner. This method requires exact measuring, cutting and installing. Frequently, a miter joint will not fit properly after the molding is cut. Generally, the compound angle cut is incorrect and the molding piece may not be able to be adjusted or re-cut for use. The installer would have to begin this corner joint with a new piece of molding. The second method of joining an inside corner is a coped joint. A coped joint is completed by installing the first piece of molding on a wall with both ends of the molding cut square to butt against the adjacent walls. The second piece of molding for an adjacent wall is cut on one end ("a coped cut") to match the profile of the first piece of molding. The coped cut is achieved by beveling a compound angle ("beveled cut") on the end of the second piece of molding. Using a miter saw, there are two positions to perform the beveled cut for coping, the flat position and the nesting (or stand-up) position.

3. The flat position uses a compound miter saw. An installer using the flat position would place the molding face up or face down on the saw table and press the edge against the fence, swivel the blade at an angle to the fence, bevel the blade at an angle to the table, and cut the molding. The angles are available from charts and vary on the type of molding used.

4. The nesting position uses any miter saw that will accommodate the size of the molding. The installer using the nesting position would place the top edge of the molding on the saw table and the bottom edge of the molding against the fence. The back side of the molding will be at a diagonal between the saw table and the saw fence similar to the positions of the wall and ceiling where molding will be installed. With the saw blade perpendicular to the saw table, swivel the blade to 45 degrees for a 90 degree corner and complete the cut. The result will be a bevel cut to the end of this piece of molding. Swiveling the blade left or right would determine whether the molding will fit to the left side or right side of the corner.

5. Once beveled, the installer using a coping saw would cut off the bevel portion by cutting along the edge of the face of the molding. The installer would cut beyond a perpendicular line to the face of the molding to remove more than the bevel from the backside of the molding. This would allow the second piece of molding to pivot closer to or away from the first piece of molding while still fitting tight at the face. This pivoting would be needed if the original bevel cut was not the exact angle. The pivoting gives the installer the flexibility to fit a tight joint and may be the main reason for using the coping method. Once the bevel is removed, the end of the molding would have the contour of its own profile. When placed on the wall it would fit tightly against the first piece of molding completing the joint. There are other tools available for removing the bevel portion of the molding. It would be the installer's personal preference of the tool used to perform a coped cut.

6. Frequently, a correct coped cut will not fit properly against the first piece of molding. This is common in the art and generally is due to the imperfections with room construction or the molding, or installer error. If the coped cut was done properly, the most common reason it doesn't fit is because the projection dimension of the first piece of molding on the wall was not the same as the projection dimension of the second piece of molding on the saw table. This has occurred for decades and continues today. Through trial and error the installer eventually gets it to fit, but at the cost of additional labor time and expense and replacement material costs. The present invention teaches that this can be remedied by using the nesting position and molding projection dimensions on the miter saw.

7. The Crown Molding Scales of the present invention are measuring scales on the miter saw table to allow the installer to quickly transfer the projection dimension of molding on the wall to the projection location on the saw table. It is helpful for the installer to understand that the projection dimension is from where the bottom edge of the molding touches the wall plane to the face of the top edge of the molding. This is used as the projection dimension from the saw fence to place the top edge of the second piece of molding on the saw table. The projection dimension of crown molding is the key element in the process of two pieces being joined in an inside or outside corner. This projection dimension is the same as the dimension on the saw table that the top edge of the molding should be distanced or project from the saw fence to cut the bevel.

8. The Crown Molding Scales of the present invention will eliminate the need for and reduce errors caused by hand held tape measures or rulers used to locate the correct dimension on the miter saw table. The Crown Molding Scales may reduce errors caused by hand held tape measures or rulers used to locate the correct dimension on the miter saw table. The Crown Molding Scales offer flexibility as they are fixed unlike hand applied measurements, marks, pieces of tape or other temporary labeling devices placed on the miter saw table. The Crown Molding Scales could be placed on or in a new saw during production by a manufacturer. Or the Crown Molding Scales could be placed on or in a material to be placed on a new or old saw.

BRIEF SUMMARY OF THE INVENTION

1. The objective of the invention is to provide the means to quickly locate and place material on the accurate location of the miter saw table. The Crown Molding Scales are comprised of a series of dimensional scales on the table of a miter saw. There are scales to provide dimensions on the saw table relative to the saw fence and there are scales to provide dimensions relative to the saw blade at a multitude of angles. The scales are fixed and do not move on the table. The Crown Molding Scales eliminate the need for and reduce errors caused by hand held tape measures or rulers used to locate the correct dimension on the miter saw table. They are beneficial for cutting crown molding, measuring items, and will assist in cutting any material the saw manufacturer recommends. The scales could be placed on or in a new saw during production by a manufacturer. Or the scales could be placed on or in a material to be placed on a new or old saw.

BRIEF DESCRIPTION OF THE DRAWINGS

FIG. 2 depicts a prior art miter saw including a miter saw table without the Crown Molding Scales.

FIG. 3 depicts a prior art miter saw with a piece of crown molding placed in the nesting position on the miter saw table.

DESCRIPTION OF THE VIEW OF THE DRAWINGS

Figure 1:
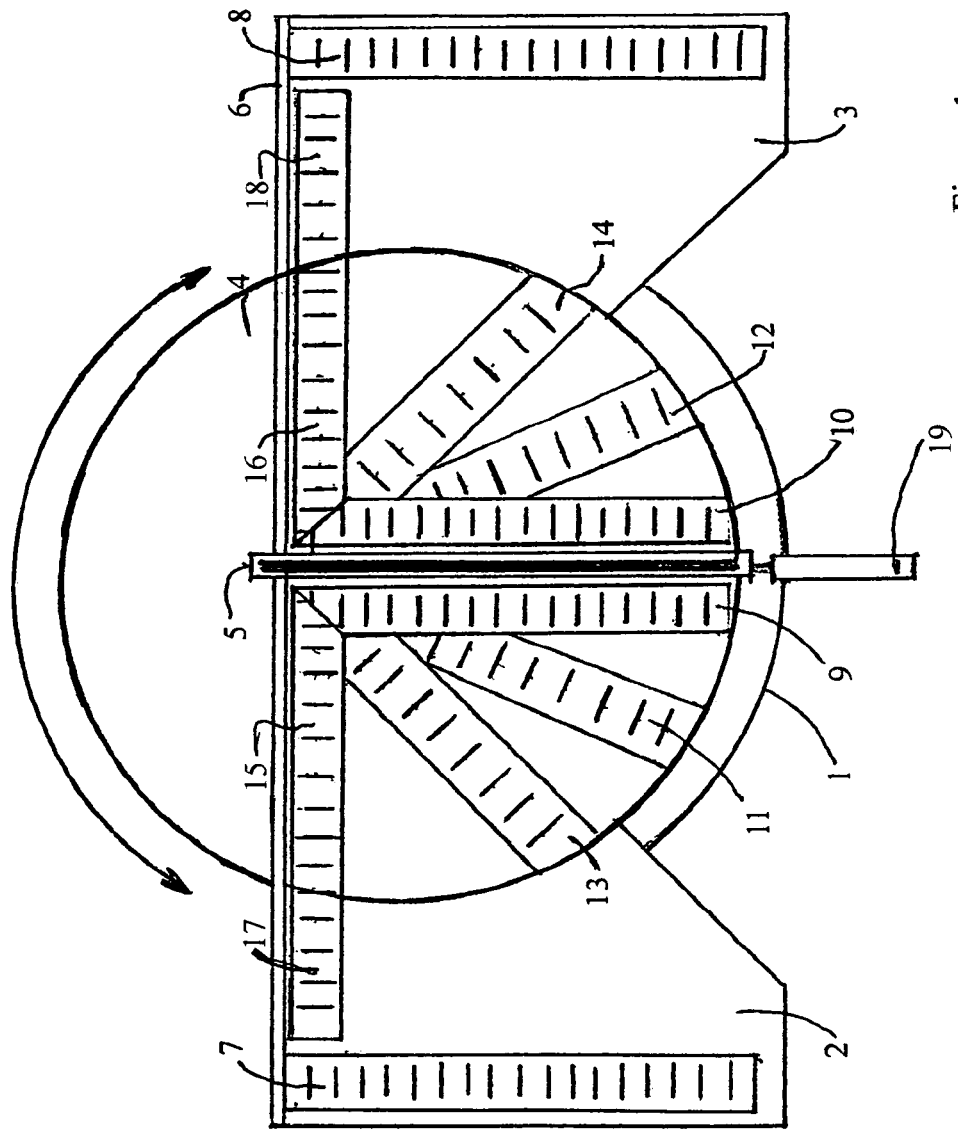
FIG. 1 depicts the Crown Molding Scales on a prior art miter saw table.

FIG. 1 depicts The Crown Molding Scales on a miter saw table and parts of the saw noted as follows;

1. A front edge 1 of the miter saw table.
2. A left side 2 of a fixed portion of the miter saw table.
3. A right side 3 of the fixed portion of the miter saw table.
4. A rotating portion or turntable 4 of the miter saw table.
5. A miter saw blade 5.
6. A miter saw fence 6.
7. A fixed scale 7 fixed on the left fixed portion 2 of the miter saw table, the fixed scale 7 having markings along a length thereof for measuring perpendicular from the saw fence 6.
8. A fixed scale 8 fixed on the right fixed portion 3 of the miter saw table, the fixed scale 8 having markings along a length thereof for measuring perpendicular from the saw fence 6.
9. A rotatable scale 9 fixed on the rotating portion 4 of the saw table, the rotatable scale 9 having markings along a length thereof for measuring perpendicular from the saw fence 6 when the saw blade 5 is perpendicular to the saw fence 6. The scale 9 is to the left of the saw blade 5.
10. A rotatable scale 10 fixed on the rotating portion 4 of the saw table, the rotatable scale 10 having markings along a length thereof for measuring perpendicular from the saw fence 6 when the saw blade 5 is perpendicular to the saw fence 6. The scale 10 is to the right of the saw blade 5.
11. A rotatable scale 11 fixed on the rotating portion 4 of the saw table, the rotatable scale 11 having markings along a length thereof for measuring perpendicular from the saw fence 6 when the saw blade 5 is swiveled to the right at a 22.5 degree angle to the saw fence 6. The scale 11 is to the left of the saw blade 5.
12. A rotatable scale 12 fixed on the rotating portion 4 of the saw table, the rotatable scale 12 having markings along a length thereof for measuring perpendicular from the saw fence 6 when the saw blade 5 is swiveled to the left at a 22.5 degree angle to the saw fence 6. The scale 12 is to the right of the saw blade 5.
13. A rotatable scale 13 fixed on the rotating portion 4 of the saw table, the rotatable scale 13 having markings along a length thereof for measuring perpendicular from the saw fence 6 when the saw blade 5 is swiveled to the right at a 45 degree angle to the saw fence 6. The scale 13 is to the left of the saw blade 5.
14. A rotatable scale 14 fixed on the rotating portion 4 of the saw table, the rotatable scale 14 having markings along a length thereof for measuring perpendicular from the saw fence 6 when the saw blade 5 is swiveled to the left at a 45 degree angle to the saw fence 6. The scale 14 is to the right of the saw blade 5.
15. A rotatable scale 15 fixed on the rotating portion 4 of the saw table, the rotatable scale 15 having markings along a length thereof for measuring perpendicular from the saw blade 5. The scale 15 is to the left of the saw blade 5 and against and parallel to the fence 6 when the saw blade 5 is perpendicular to the saw fence 6.
16. A rotatable scale 16 fixed on the rotating portion 4 of the saw table, the rotatable scale 16 having markings along a length thereof for measuring perpendicular from the saw blade 5. The scale 16 is to the right of the saw blade 5 and against and parallel to the fence 6 when the saw blade 5 is perpendicular to the saw fence 6.
17. A fixed scale 17 fixed on the left fixed portion 2 of the miter saw table, the fixed scale 17 having markings along a length thereof. The scale 17 is against and parallel to the saw fence 6.
18. A fixed scale 18 fixed on the right fixed portion 3 of the miter saw table, the fixed scale 18 having markings along a length thereof. The scale 18 is against and parallel to the saw fence 6.
19. A saw blade handle 19 for swiveling the rotating portion 4 of the saw table.

FIG. 2 depicts a prior art miter saw, the miter saw including a table 100 and a pivot arm 120, wherein the table 100 includes horizontal fixed portions 102, 103 and a rotating portion 104 (or turntable 104), wherein the pivot arm 120 is pivotably mounted to the rotating portion 104, and wherein the table 100 further includes a fence 106 having a workpiece abutment surface, and a handle 119 for rotating the rotating portion 104.

FIG. 3 depicts a piece of crown molding C placed in the nesting position on the table 100 of the prior art miter saw of FIG. 2, wherein a rotatable saw blade 105 supported by the pivot arm 120 of the miter saw is further depicted.

DESCRIPTION OF THE INVENTION

1. This invention is comprised of a series of dimensional scales (linear measuring devices) on a miter saw table, each scale having markings for measuring along a length thereof. This invention will provide the means to allow an installer to quickly locate and accurately place material on the desired location of a miter saw table. In FIG. 1, the front edge 1 of the miter saw table is for location only. Reference to a saw table would mean the tables of a miter saw and would include both the fixed portions 2 and 3 and the rotating portion 4 of a miter saw table. Reference of the scales would include scales 7, 8, 9, 10, 11, 12, 13, 14, 15, 16, 17 and 18. Scales 7, 8, 17 and 18 are on the fixed portions 2 and 3 respectively of a saw table. Scales 7 and 8 provide dimensions relative to the miter saw fence 6. Scales 9, 10, 11, 12, 13, 14, 15 and 16 are on the rotating portion 4 of a saw table. Scales 9, 10, 11, 12, 13, 14, 15 and 16 provide dimensions relative to the saw fence 6 and saw blade 5 at a plurality of angles on the rotating portion 4 of a saw table. The scales could be placed on or in a saw during production by a manufacturer. The scales could be placed on or in a material to be placed on a saw during production by a manufacturer. The scales could be placed on or in a material to be placed on an existing saw. The scales could be projected by light beam or laser beam onto a saw. The scales eliminate the need for a hand held tape measure or ruler to locate a dimension or place a mark at a specified dimension on a saw table. The scales will reduce errors caused by using a hand held tape measure or ruler to locate a dimension or place a mark at a specified dimension on a saw table. The scales offer flexibility as they are fixed on a saw table unlike hand applied measurements, marks, pieces of tape or other temporary labeling devices placed on a saw table. The scales are for cutting crown molding and cutting any material a saw manufacturer recommends.

2. This invention is directed to providing measuring scales on a miter saw table. The projection dimension of crown molding is the key element for cutting two pieces of crown molding being joined in an inside corner or an outside corner. The projection dimension is the distance from the face of a wall where the bottom edge of the molding touches the wall to the face of the top edge of the molding. The nesting position is the placement of a piece of crown molding on the saw table with the bottom edge of the molding against the fence and the top edge of the molding on the table as shown in FIG. 3. The face of the molding is at a diagonal between the fence and the table. In this position the projection dimension is the distance the top edge of the molding projects from the fence. The primary use of this invention allows the installer to transfer the projection dimension of crown molding on the wall to the corresponding projection dimension location on the miter saw table.

In FIG. 1, the scales provide projection dimensions on the saw table as follows:
   a. scales 7 and 8 measure perpendicular from the saw fence 6, and scales 17 and 18 measure perpendicular from the saw blade 5 when the saw blade 5 is perpendicular to the saw fence 6;
   b. with the saw blade 5 perpendicular to the saw fence 6, scales 9 and 10 measure perpendicular from the saw fence 6 and scales 15 and 16 measure perpendicular from the saw blade 5;
   c. with the saw blade 5 swiveled left at 22.5 degrees, scale 12 measures perpendicular from the saw fence 6;
   d. with the saw blade 5 swiveled left at 45 degrees, scale 14 measures perpendicular from the saw fence 6;
   e. with the saw blade 5 swiveled left at another angle, a scale placed at this degree angle would measure perpendicular from the saw fence 6;
   f. with the saw blade 5 swiveled right at 22.5 degrees, scale 11 measures perpendicular from the saw fence 6;
   g. with the saw blade 5 swiveled right at 45 degrees, scale 13 measures perpendicular from the saw fence 6;
   h. with the saw blade 5 swiveled right at another angle, a scale placed at this degree angle would measure perpendicular from the saw fence 6;
   i. scales 7, 8, 9, 10, 11, 12, 13, 14, 15, 16, 17 and 18 can generally measure in relation to the saw fence 6 and the saw blade 5;
   j. scales 7, 8, 9, 10, 11, 12, 13, 14, 15, 16, 17 and 18 can generally measure with no relation to the saw fence 6 and the saw blade 5.

3. Here is an example which is descriptive only and not an instruction. Proper safety methods should be taken for actual installation. With the scales on a miter saw table, the optimal use of the invention is described in the following example. To join crown molding in an inside corner a user would:
   a. Secure the first piece of crown molding on a wall to the left of a 90 degree inside corner. This piece is square cut on end and butts firmly against the adjacent wall.
   b. Measure near the adjacent wall the projection dimension (X) of the first piece of molding.
   c. Swivel the miter saw blade 5 (FIG. 1) to the left at 45 degrees, scale 14 (FIG. 1) is now perpendicular to the saw fence 6.
   d. Place the top edge of the second piece of molding on the saw table. Place the top edge of the molding on dimension (X) on scale 7 (FIG. 1) and the right hand end of the molding on dimension X on scale 14 (FIG. 1). Lower the saw blade 5 (FIG. 1) to make a bevel cut to prepare the molding for the coping cut.
   e. Using a coping saw, cut off the bevel portion on the end of the second piece of molding. This coped end will now fit against the first piece of molding.
   f. Position the second piece of molding on the wall to the right of the inside corner and slide the coped end firmly against the first piece of molding. Secure the second piece of molding to complete this inside corner joint.

5. Problems frequently occur using other methods that do not take projection dimension into account in the process of these methods. Mistakes made are costly and generally rectified through time consuming trial and error. The scales facilitate the accuracy necessary to avoid problems caused by any methods.

I claim:
1. In a power miter saw comprising:
   a miter saw table having fixed table portions and a rotatable table portion, each fixed table portion having a horizontal table surface for supporting a workpiece, and said rotatable table portion having a horizontal table surface for supporting the workpiece, said rotatable table portion being center mounted between said fixed table portions for rotating on a vertical axis for a selective movement through a plurality of angular miter cutting positions;
   a pivot arm; and
   a rotatable saw blade operably mounted on said pivot arm;
   wherein said pivot arm is pivotally secured to said rotatable table portion for rotation with the rotatable table portion and for providing pivotal movement of the saw blade toward and away from the rotatable table portion between a non-contacting workpiece position distanced from the rotatable table portion and a contacting workpiece position in order to perform a cutting task; and
   a saw fence mounted on said fixed table portions, said fence having a workpiece abutment surface;
   the improvement comprising:
   a fixed linear scale having markings along a length thereof for measuring along the length thereof, said fixed linear scale being fixed on the horizontal table surface of one of the fixed table portions, said fixed linear scale extending lengthwise perpendicularly to the workpiece abutment surface of the fence for providing a measure of a first projection perpendicular to the fence; and a plurality of rotatable linear scales each having markings along a length thereof for measuring along the length thereof, said rotatable linear scales being fixed on the horizontal table surface of the rotatable table portion for rotation therewith such that each rotatable linear scale selectively provides a measure of a second projection perpendicular to the workpiece abutment surface of the fence when the rotatable table portion and the saw blade are rotated to a corresponding one of the plurality of said angular miter cutting positions, wherein a first one of the rotatable linear scales extends lengthwise in a direction that is parallel to a plane of the saw blade, and a second one of the rotatable linear scales extends lengthwise in a direction that forms an acute angle with the lengthwise direction of the first rotatable linear scale, such that the rotatable table portion is pivotable to a first one of said angular miter cutting positions in which said first rotatable linear scale extends lengthwise perpendicular to the workpiece abutment surface of the fence to selectively provide said measure of said second projection, and the rotatable table portion is pivotable to a second one of said angular miter cutting positions in which said second rotatable linear scale extends lengthwise perpendicular to the workpiece abutment surface of the fence to selectively provide said measure of said second projection;

whereby said fixed linear scale and a selected one of said rotatable linear scales each provides an accurate measurement for aligning crown molding when placing the crown molding on the miter saw table by each providing the measurement from the fence in the selected one of said plurality of angular miter cutting positions.

2. The power miter saw according to claim 1, further comprising:
a third one of the rotatable linear scales that extends lengthwise in a direction that forms an acute angle with the lengthwise direction of the first rotatable linear scale such that the rotatable table portion is pivotable to a third one of said angular cutting positions in which said third rotatable linear scale extends lengthwise perpendicular to the workpiece abutment surface of the fence to selectively provide said measure of said second projection.

3. The power miter saw according to claim 2, wherein the second and third rotatable linear scales are located on a same side of the first rotatable linear scale.

4. The power miter saw according to claim 2, wherein the second and third rotatable linear scales are located on opposite sides of the first rotatable linear scale.

5. The power miter saw according to claim 1, wherein when the first one of the rotatable linear scales extends lengthwise in a direction that is perpendicular to the workpiece abutment surface of the fence, said acute angle opens in a direction extending away from the fence.

6. The power miter saw according to claim 1, further comprising:
a second fixed linear scale having markings along a length thereof for measuring along the length thereof, said second fixed linear scale being fixed on the horizontal table surface of another one of the fixed table portions, said second fixed linear scale extending lengthwise perpendicularly to the workpiece abutment surface of the fence for providing a measure of a third projection perpendicular to the fence.

* * * * *